US009669397B2

(12) United States Patent
Althoff et al.

(10) Patent No.: US 9,669,397 B2
(45) Date of Patent: Jun. 6, 2017

(54) METAL DOPED ZEOLITE AND PROCESS FOR ITS PREPARATION

(71) Applicant: SUED-CHEMIE IP GMBH & CO. KG, Munich (DE)

(72) Inventors: Roderik Althoff, Rosenheim (DE); Arno Tissler, Tegernheim (DE); Helge Toufar, Dessau (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 428 days.

(21) Appl. No.: 14/324,498

(22) Filed: Jul. 7, 2014

(65) Prior Publication Data

US 2014/0322127 A1    Oct. 30, 2014

Related U.S. Application Data

(62) Division of application No. 12/601,502, filed as application No. PCT/EP2008/004089 on May 21, 2008, now abandoned.

(30) Foreign Application Priority Data

May 24, 2007    (DE) .................. 10 2007 024 125
May 24, 2007    (DE) .................. 10 2007 063 604

(51) Int. Cl.
| | |
|---|---|
| *B01J 29/06* | (2006.01) |
| *B01J 29/88* | (2006.01) |
| *B01J 29/072* | (2006.01) |
| *B01J 29/068* | (2006.01) |
| *B01J 29/74* | (2006.01) |
| *B01J 29/76* | (2006.01) |
| *B01J 29/54* | (2006.01) |
| *B01J 29/56* | (2006.01) |
| *B01J 29/67* | (2006.01) |
| *B01J 29/68* | (2006.01) |
| *B01D 53/94* | (2006.01) |
| *B01J 29/064* | (2006.01) |
| *B01J 29/44* | (2006.01) |
| *B01J 29/46* | (2006.01) |
| *B01J 37/30* | (2006.01) |

(52) U.S. Cl.
CPC .......... *B01J 29/88* (2013.01); *B01D 53/9418* (2013.01); *B01J 29/061* (2013.01); *B01J 29/064* (2013.01); *B01J 29/068* (2013.01); *B01J 29/072* (2013.01); *B01J 29/44* (2013.01); *B01J 29/46* (2013.01); *B01J 29/54* (2013.01); *B01J 29/56* (2013.01); *B01J 29/67* (2013.01); *B01J 29/68* (2013.01); *B01J 29/74* (2013.01); *B01J 29/7415* (2013.01); *B01J 29/76* (2013.01); *B01J 29/7615* (2013.01); *B01J 37/30* (2013.01); *B01D 2251/2062* (2013.01); *B01D 2255/104* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01D 2255/502* (2013.01); *B01D 2255/504* (2013.01); *B01J 2229/18* (2013.01); *B01J 2229/186* (2013.01); *B01J 2229/37* (2013.01); *B01J 2229/38* (2013.01)

(58) Field of Classification Search
CPC ...... B01J 29/061; B01J 29/072; B01J 29/068; B01J 29/44; B01J 29/46; B01J 29/74; B01J 29/76; B01J 29/54; B01J 29/56; B01J 29/67; B01J 29/68; B01J 29/7415; B01J 29/7615; B01J 37/30; B01J 2229/186; B01J 2229/37; B01J 2229/38; B01D 53/9418; B01D 2255/50; B01D 2255/502; B01D 2255/504
USPC ........................................ 502/60, 74, 77, 78
See application file for complete search history.

(56) References Cited

U.S. PATENT DOCUMENTS

| | | | |
|---|---|---|---|
| 4,257,872 | A | 3/1981 | La Pierre et al. |
| 4,792,633 | A | 12/1988 | Wojtkowski |
| 5,098,684 | A | 3/1992 | Kresge et al. |
| 5,102,643 | A | 4/1992 | Kresge et al. |
| 5,171,553 | A | 12/1992 | Li et al. |
| 5,250,282 | A | 10/1993 | Kresge et al. |
| 5,451,387 | A | 9/1995 | Farnos et al. |
| 5,603,914 | A | 2/1997 | Balkus, Jr. et al. |

FOREIGN PATENT DOCUMENTS

| | | |
|---|---|---|
| EP | 0 955 080 A1 | 11/1999 |
| GB | 1 357 591 A1 | 6/1974 |

OTHER PUBLICATIONS

Pirngruber, G.D., et al, "On determining the nuclearity of iron sites in Fe-ZSM-5—a critical evaluation", Physical Chemistry Chemical Physics, 2006, vol. 8, pp. 3939 to 3950, the Owner Societies.
Battiston, A.A., et al, "Reactivity of binuclear Fe complexes in over-exchanged Fe/ZSM5, studied by in situ XAFS spectroscopy 2. Selective catalytic reduction of NO with isobutane", Journal of Catalysis, 2003, vol. 218, No. 1, pp. 163 to 177, Elsevier Inc.
Battiston, A.A., et al, "Evolution of Fe species during the synthesis of over-exchanged Fe/ZSM5 obtained by chemical vapor deposition of FeCI3", Journal of Catalysis, 2003, vol. 213, pp. 251 to 271, Elsevier Science.
Chavan, S., et al, "Structure and Catalytic Properties of Dimeric Copper(II) Acetato Complexes Encapsulated in Zeolite-Y", Journal of Catalysis, 2000, vol. 192, pp. 286 to 295, Academic Press.

(Continued)

*Primary Examiner* — Elizabeth Wood
(74) *Attorney, Agent, or Firm* — Walter Ottesen, P.A.

(57) ABSTRACT

A metal-doped or metal-exchanged zeolite is disclosed, wherein the doping metal is present in the zeolite in the form of individual atoms i.e. as monomeric and/or dimeric species. Further, a process for the preparation of such a metal-doped or metal-exchanged zeolite is disclosed. The metal-doped zeolites are useful, in particular, as catalysts for the reduction of nitrogen oxides.

20 Claims, No Drawings

(56) References Cited

OTHER PUBLICATIONS

Hansen, N., et al, "A Reaction Mechanism for the Nitrous Oxide Decomposition on Binuclear Oxygen Bridged Iron Sites in Fe-ZEM-5", J. Phys. Chem. C 2007, 111, No. 5, pp. 2092-2101, American Chemical Society.
International Search Report dated Jan. 19, 2009 of international application PCT/EP2008/004089 on which this application is based.
English translation of International Preliminary Report on Patentability and Written Opinion of the international searching authority dated Dec. 17, 2009 in international patent application PCT/EP2008/004089 on which the claim of priority is based.

METAL DOPED ZEOLITE AND PROCESS FOR ITS PREPARATION

CROSS REFERENCE TO RELATED APPLICATIONS

This application is a divisional application of U.S. patent application Ser. No. 12/601,502, filed Nov. 23, 2009 (now abandoned), which is, in turn, a national phase of international patent application PCT/EP2008/004089, filed May 21, 2008, designating the United States and claiming priority from German applications 10 2007 024 125.0 and 10 2007 063 604.2, both filed May 24, 2007, and the entire contents of the above applications are incorporated herein by reference.

FIELD OF THE INVENTION

The present invention relates to a metal-doped zeolite, wherein the catalytically active doping metal is present isolated in the zeolite, i.e. as a monomeric species and/or dimeric species, and to a process for the preparation of such zeolites and their use as catalyst material, in particular for the purification of exhaust gases, quite particularly for the reduction of nitrogen oxides.

BACKGROUND OF THE INVENTION

Metal-doped zeolites are known from the state of the art and are widely used as catalyst material for the purification of exhaust gases.

Because of the harmful effects of nitrogen oxides on the environment, it is important to further reduce these emissions. Clearly lower NOx emission limits for stationary and motor vehicle gases than are customary today are planned in the United States for the near future and are also being discussed in the European Union.

In order to be able to observe these limits, in the case of mobile combustion engines (diesel engines) this can no longer be achieved by measures inside the engine, but only by an exhaust-gas post-treatment, for example with suitable catalysts.

The denitrification of combustion gases is also called DeNOx. In automobile engineering, selective catalytic reduction (SCR) is one of the most important DeNOx techniques. Hydrocarbons (HC-SCR) or ammonia ($NH_3$-SCR) or $NH_3$ precursors such as urea (Ad-Blue®) usually serve as reducing agents. Metal-exchanged zeolites (also called metal-doped zeolites) have proved to be very active catalysts that can be used in a broad SCR temperature range. They are mostly non-toxic and produce less $N_2O$ and $SO_3$ than the customary catalysts based on $V_2O_5$. In particular iron-doped zeolites represent good alternatives to the normally used vanadium catalysts, because of their high activity and resistance to sulphur under hydrothermal conditions. Customary processes for doping zeolites with metals comprise for example methods such as liquid ion exchange, solid-phase ion exchange, vapour-phase ion exchange, mechanical-chemical processes, impregnation processes and the so-called extra-skeletal processes.

U.S. Pat. No. 5,171,553 discloses for example an ion-exchange process in an aqueous solution wherein silicon-rich zeolites with Si/Al ratios of over 5 to approx. 50 are customarily used as support.

Problems result in particular when doping or introducing active components such as e.g. iron, vanadium, cobalt and nickel into the zeolite, as different oxidation numbers of these catalytically active metals occur next to each other and also the desired catalytically active species is not always obtained, or the catalytically active species change into catalytically inactive species because of the parameters of the doping process (oxygen, temperature, moisture, etc.).

The doping of zeolites with iron by solid-state ion exchange is known (EP 0 955 080 B1), wherein a mixture of the desired zeolite, a metal compound and an ammonium compound is sintered under a protective atmosphere, in particular a reductive protective atmosphere, with the result that metal-containing, in particular iron-doped, catalysts with an increased long-term stability are obtained.

However, it has been shown that in practically all the known processes of the state of the art, cluster species of the catalytically active metals, which are catalytically inactive or greatly reduce the catalytic activity, form as a result of the metal exchange inside the zeolite. By "clusters" are meant polynuclear bridged or unbridged metal compounds which contain at least three identical or different metal atoms. Metal-exchanged zeolites in which no metal clusters were able to be detected inside the zeolite skeleton are thus far unknown.

SUMMARY OF THE INVENTION

The object of the present invention was therefore to provide a metal-containing zeolite material which has an increased catalytic activity compared with the metal-containing zeolite materials known thus far.

This object is achieved by a metal-exchanged zeolite, wherein the replacement metal is present in the zeolite as isolated individual atoms or cations (monomeric species) and/or as dimeric species. By "metal-exchanged" is meant that a metal or metal cation is replaced by a cation, typically $H^+$, $Na^+$, $NH_4^+$ etc., present in the zeolite or zeolite skeleton.

The metal-exchanged zeolite according to the invention (here also synonymously called metal-doped zeolite) is free from catalytically inactive or catalytically less active metal clusters, with the result that only monomeric (isolated species in the form of individual metal atoms or metal cations) or dimeric catalytically highly-active metal species are present in the pore structure i.e. more precisely in the zeolite skeleton. The metal species can in other words also be called "skeleton metal species". It is important that the term "monomeric or dimeric species" as used in the invention does not include so-called "ship-in-a-bottle" zeolitic host-guest complexes, such as have been described e.g. in U.S. Pat. No. 5,603,914 or in S. Chavan et al. J. Catalysis 192, pp. 286-295 (2000) for cobalt-cyclopentadienyl, or dimeric copper acetate, incorporated in the zeolite pores.

The dimeric metal species in the zeolite according to the invention can be present either bridged (e.g. bridged via O or OH atoms) or unbridged, thus have a metal-metal bond.

Much smaller quantities can thereby be used during metal doping or metal replacement (often also called metal loading). Furthermore, the activity and selectivity of the zeolite according to the invention is significantly increased compared with the known zeolites of the state of the art. It was found that generally, compared with the zeolites of the state of the art doped or exchanged with the same metal in which, as explained above, mostly metal clusters are present in the zeolite, the metal-exchanged zeolites according to the invention show an increase in activity of approx. 30% for each metal during the reduction from NO to $N_2$. Inactive metal clusters also reduce the pore volume and impede the gas diffusion or lead to undesired secondary reactions, which can also be advantageously prevented by the zeolites according to the invention.

By "zeolite" is meant, within the framework of the present invention according to the definition of the International Mineralogical Association (D. S. Coombs et al., Can. Mineralogist, 35, 1997, 1571), a crystalline the group of the aluminium silicates with a structure of the general formula

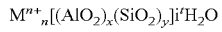

which consist of $SiO_{4/2}$ and $AlO_{4/2}$ tetrahedra which are linked by common oxygen atoms to form a regular three-dimensional network. The Si/Al=y/x ratio is always ≥1 according to the so-called "Löwenstein Rule", which states that two adjacent negatively-charged $AlO_4^-$ tetraheda may not occur next to each other. Thus, although more exchange spaces are available for metals with a low Si/Al ratio the zeolite becomes increasingly thermally unstable.

The zeolite structure contains voids and channels which are characteristic of each zeolite. The zeolites are divided into different structural types (see above) according to their topology. The zeolite skeleton contains open voids in the form of channels and cages which are normally occupied by water molecules and extra-skeletal cations which can be replaced. An aluminium atom attracts an excess negative charge which is compensated for by these cations. The interior of the pore system is represented by the catalytically active surface. The more aluminium and the less silicon a zeolite contains, the denser is the negative charge in its lattice and the more polar its inner surface. The pore size and structure are determined, in addition to the parameters, during production (use or type of templates, pH, pressure, temperature, presence of seed crystals) by the Si/Al ratio which determines the greatest part of the catalytic character of a zeolite. In the present case it is particularly preferred if the Si/Al ratio of a zeolite according to the invention lies in the range from 10 to 20 (corresponds to a $SiO_2/Al_2O_3$ ratio of 20-40).

In liquid-exchange processes for the preparation of metal-doped or -exchanged zeolites there is a strong affinity for the replacement of polyvalent and heavy metal with lighter ones and in particular with hydrogen and/or $NH_4^+$.

In hydrated zeolites, dehydration takes place mostly at temperatures below approximately 400° C. and is very largely reversible.

Because of the presence of 2- or 3-valent cations as tetrahedron centre in the zeolite skeleton the zeolite receives a negative charge in the form of so-called anion sites in whose vicinity the corresponding cation positions are located. The negative charge is compensated for by incorporating cations, e.g. metal cations, into the pores of the zeolite material. A distinction between zeolites is drawn mainly according to the geometry of the voids which are formed by the rigid network of the $SiO_4/AlO_4$ tetrahedra. The entrances to the voids are formed from 8, 10 or 12 "rings" (narrow-, average- and wide-pored zeolites) Specific zeolites show a uniform structure (e.g. ZSM-5 with MFI topology) with linear or zig-zag channels, while in others larger voids attach themselves behind the pore openings, e.g. in the case of the Y and A zeolites with the topologies FAU and LTA. Generally, 10 and 12 "ring" zeolites are preferred according to the invention.

In principle, within the framework of the present invention, any zeolite, in particular any 10 and 12 "ring" zeolite, can be used. Zeolites with the topologies AEL, BEA, CHA, EUO, FAO, FER, KFI, LTA, LTL, MAZ, MOR, MEL, MTW, LEV, OFF, TON, TRI and MFI are preferred according to the invention. Zeolites of the topological structures BEA, MFI, FER, MOR, MTW and TRI are quite particularly preferred.

According to the invention zeolite-like materials can likewise be used, such as are described for example in U.S. Pat. No. 5,250,282, to the full disclosure content of which reference is made here. Further zeolite materials preferred according to the invention are mesoporous zeolite materials of silicates or aluminosilicates which are known under the name M41S and are described in detail in U.S. Pat. No. 5,098,684 and U.S. Pat. No. 5,102,643, to the full disclosure content of which reference is likewise made here.

Further, so-called silico-aluminophosphates (SAPOs) which have formed from isomorphically exchanged aluminophosphates can be used according to the invention.

It is preferred that the pore sizes of the zeolites used according to the invention lie in the range from 0.4 to 1.5 nm which, also because of the more favourable steric ratios for monomeric or dimeric metal species, contributes advantageously to the formation of monomeric or dimeric metal species instead of metal clusters.

Typically the metal content or the degree of exchange of a zeolite is decisively determined by the metal species present in the zeolite. The zeolite can also be doped or exchanged with only one metal or with different metals.

There are usually three different centres in zeolites described as so-called α-, β- and γ-positions, which define the position of the exchange spaces (also called "exchangeable positions or sites"). All three positions are available to reactants during the $NH_3$-SCR reaction, in particular when using MFI, BEA, FER, MOR, MTW and TRI zeolites.

The so-called α-type cations show the weakest bond to the zeolite skeleton and are the last to be occupied in a liquid ion exchange. The degree of occupancy increases markedly from a degree of exchange of around 10% as the metal content increases and amounts to around 10 to 50% in total at a degree of exchange of up to M/Al=0.5. Cations at this site form very active redox catalysts.

On the other hand, the β-type cations which represent the most-occupied position and catalyze the HC-SCR reaction most effectively during liquid-ion exchange, in particular with small degrees of exchange, display an average bonding strength to the zeolite skeleton. This position is filled immediately after the γ-position and its degree of occupancy falls, from a degree of exchange of around 10%, as the metal content increases and amounts to around 50 to 90% for a degree of exchange of up to M/Al=0.5. In the state of the art it is known that from a degree of exchange of M/Al>0.56 typically only polynuclear metal oxides are still deposited.

The γ-type cations are those cations with the strongest bond to the zeolite skeleton and the most thermally stable. They are the least-occupied position during liquid-ion exchange, but are filled first. Cations, in particular iron and cobalt, in these positions are highly-active and are the catalytically most active cations.

The preferred metals (or metal cations) for the exchange or doping are catalytically active metals such as Fe, Co, Ni, Ag, Cu, V, Rh, Pd, Pt, Ir, and quite particularly preferred Fe, Co, Ni and Cu, which also form bridged dimeric species as are mainly present in particular at high degrees of exchange in the case of the zeolite according to the invention.

Overall, the quantity of metal calculated as corresponding metal oxide is 1 to 5 wt.-% relative to the weight of the metal-exchanged zeolite. In particular it is preferred that more than 50% of the exchangeable sites (i.e. (α-, β- and γ-sites) are exchanged. Quite particularly preferably, more than 70% of the exchangeable sites are exchanged. However, free sites should remain which are preferably Brønstedt acid centres. This is because NO is strongly absorbed both at the exchanged metal centres and also in ion-exchange positions or at Brønstedt centres of the zeolite skeleton. Moreover, $NH_3$ reacts for preference with the strongly acid Brønstedt centres, the presence of which is thus very important for a successful $NH_3$-SCR reaction. The presence of free radical exchange spaces and/or Brønstedt acid centres and the metal-exchanged lattice places is thus quite particularly preferred according to the invention. Therefore, a degree of exchange of 70-90% is most preferred. At a degree of exchange of more than 90%, a reduction in activity is observed during the reduction of NO to $N_2$ and the SCR-$NH_3$ reaction.

Because of the danger of hydrothermal deactivation of metal-exchanged zeolites, which is preceded by a dealuminization and migration of metal from the ion-exchange centres of the zeolite, it is preferred that the doping metals if possible do not form a stable compound, as a dealuminization is thereby promoted.

The object of the present invention is further achieved by a process for the preparation of an above-described metal-exchanged doped zeolite, wherein firstly in a sealable reaction vessel an aqueous or water-containing suspension of a zeolite is prepared, and wherein the process further comprises the steps of a) increasing the pH of the suspension to a value in the range from 8 to 10, preferably using $NH_4OH$ (ammonia water) and setting the oxygen level in the reaction vessel to a value of <10%, preferably <5%
b) reducing the pH to a value in the range from 1.5 to 6
c) adding a metal salt and reacting over a period of 1 to 15 hours
d) filtering off and washing the metal-exchanged (doped) zeolite.

The effect of controlling the reaction, in particular by increasing and reducing the pH (the so-called "pH control" of the process according to the invention), is that a high degree of exchange of approx. 70-90% can be achieved without metal clusters unsuitable for catalysis forming in the metal-exchanged zeolite, something not previously achieved with processes known from the state of the art, in particular in the field of liquid exchange.

The exchange rate and the extent of the exchange is further increased by the pre-treatment, in particular with ammonia. After setting the oxygen level, the reaction mixture is stirred for approx. 1 to 60 minutes.

Surprisingly it was found that even if the pH is reduced to a value of 1.5 to 6 in step b) of the process according to the invention, highly-exchanged zeolites (exchange limit approx. 90%) without metal clusters form, although thus far in the state of the art it has been assumed and also found that, at low pHs, in most catalytically active metals, polynuclear hydroxo- or oxo species form which are catalytically inactive.

By repeating the process according to the invention several times, the degree of exchange or doping can be increased to 100% of the exchangeable sites in the zeolite although, as stated above, 90% represents the preferred upper limit. It is equally possible, albeit in less preferred embodiments, that different metals are used for exchange or doping, varying the choice of metal salt in step c). Preferably, the above-listed salts of the catalytically active metals, as of their chlorides, sulphates, acetates, mixed ammonium-metal salts, nitrates and soluble complex compounds are used.

The metal salt can be added both in solid form and also in the form of a solution, wherein aqueous solutions are preferred because they are easier to work up, but there is nothing to prevent dissolved metal salts also being used in organic solvents or mixtures of aqueous or organic solvents.

Typically, the resultant suspension contains 5 to 25 wt.-% zeolites in order to guarantee a good thorough mixing by means of stirring, as higher levels allow the mixture to solidify.

The pH is preferably increased by adding a strong base, quite particularly preferably in the form of ammonia water. Other suitable bases can also be used, of course, wherein bases such as NaOH or KOH are less advantageous because of their tendency to promote the formation of polynuclear hydroxo species with the metal salts.

The molar ratio of ammonia to zeolite is 0.01 to 0.1 in order to be able to accurately set the pH level.

The suspension is typically acidified by adding a mineral acid such as HCl, $H_2SO_4$, $HNO_3$ etc. The acid, the anion of which is preferably also the anion of the corresponding metal salt which is then added, is used. HCl is less preferred however because of its high corrosivity during waste-water purification.

Quite particularly preferably the pH is thereby reduced to a range from 1.5 to 3 which, as already stated unlike in the state of the art, surprisingly does not lead to polynuclear hydroxo-bridged metal-cluster species.

The acidification of the suspension is followed firstly by heating to a temperature in the range from 80 to 100° C. and then stirring for approx. 2 hours. The increased temperature during ion exchange advantageously leads to the hydration sphere of the metal ions being reduced and the exchange thus accelerated.

It is important, within the framework of the process according to the invention, that the oxygen level in the reaction vessel during the reaction is <10 and quite preferably <5%, as here likewise the formation of polynuclear oxygen- or hydroxobridged metal species is suppressed.

The reaction time for the metal exchange is approx. 2 to 8 hours, quite particularly preferably 3 to 5 hours. The powder obtained after reaction and doping is washed, filtered-off, and optionally dried at above 100° C., wherein the temperature during drying is not to exceed 250° C., as otherwise this leads to partial calcination.

A calcination can be carried out in a range from 400 to 600° C., quite preferably under inert gas.

Usually, any metal salt mentioned above can be used, irrespective of whether the metal is present in a di-, tri- or quadrivalent oxidation step, as the redox pairs usually balance during calcination. However, the divalent salts are quite particularly preferred in particular in the case of iron salts, as these typically tend less towards the precipitation of poorly soluble metal hydroxides and blocking of the zeolite pores. With higher-valency iron salts the chosen exchange time should therefore not be too long, because more hydroxides also precipitate as a result.

The zeolite prepared by means of the process according to the invention is typically used when purifying exhaust gases, in particular in the reduction of nitrogen oxides.

DESCRIPTION OF THE PREFERRED
EMBODIMENTS OF THE INVENTION

The invention is described in more detail below with reference to embodiment examples which are not, however, to be considered limiting.

General:

UV/VIS MIR diffuse reflection measurements were carried out on the zeolites obtained according to the invention using a Perkin Elmer UV/VIS spectrometer with diffuse reflection and $BaSO_4$ as reference. The absorption intensities were evaluated according to the Schuster-Kubelka-Munk equation (often also called the Kubelka Munk theory).

Example 1

Preparation of an Iron-Exchanged (or Doped) Zeolite 2 g $NH_4$-ZSM5 (alternatively H-ZSM5 or Na-ZSM5 was also used) was suspended in an aqueous solution in a quantity of 10 to 15 wt.-% relative to the aqueous solution, and stirred at room temperature. Ammonia in the form of ammonia water was then added in a ratio of $NH_3$ to zeolite of 0.04, with the result that a pH of >9 was set. The pH was at most 10.

The reaction vessel was then closed, flushed with inert gas and the atmosphere inside the vessel set to an oxygen level of <5%, followed by a wait of 20 min.

Sulphuric acid in the form of dilute sulphuric acid concentration (25 vol. %) was then added, wherein the ratio of sulphuric acid to zeolite was 0.05. The oxygen level was left at <5% and a pH of 4.0 set. The acidified suspension was then heated to a temperature of 90 and thereafter immediately solid $FeSO_4 \cdot 7\ H_2O$ added in a weight ratio of $FeSO_4$:7 $H_2O$ to zeolite of 0.2. The pH was 3 and the reaction was carried out in the reaction vessel over 8 hours accompanied by stirring at an oxygen level of less than 5%.

The exchanged zeolite, which had a virtually white colour, was then filtered and washed three times with distilled water and dried at 150° C. Calcination took place under inert gas at 500° C. for 3 hours.

The resulting product contained 1.5 wt.-% $Fe_2O_3$ relative to the total mass of zeolite.

UV/VIS Spectrum:

The thus-obtained iron-exchanged zeolite showed no bands in the wavelength range of 10-25,000 $cm^{-1}$ assigned to the polynuclear Fe clusters (i.e. more than 3 Fe atoms) which are only slightly, if at all, active during the SCR reaction.

On the other hand, the iron-exchanged zeolite according to the invention shows thick bands in the wavelength range of 25,000 to 30,000 $cm^{-1}$, which are allocated to iron-oxide dimers (Fe—O—Fe) which are highly active during the SCR reaction. Likewise, the zeolite obtained in example 1 showed bands in the wavelength range between 30,000 and 50,000 $cm^{-1}$, which can be allocated to monomers, iron species arranged in the zeolite lattice, or in particular monomeric FeOH species which are likewise highly active for the SCR reaction.

A catalyst prepared by means of the iron zeolite according to the invention obtained in example 1 thus does not have polynuclear catalytically inactive iron clusters.

Example 2

Preparation of a Cobalt-Exchanged Zeolite

The reaction took place as in example 1, except that in place of iron sulphate ($FeSO_4 \cdot 7\ H2O$), a corresponding quantity of $Co(NO_3)_2$ or alternatively $Co(acac)_2$ ((acac) =acetylacetonate) was used. Instead of sulphuric acid, the corresponding quantity of 0.01 M $HNO_3$ was used.

UV/VIS: 38-45,000 $cm^{-1}$ (m) (SCR active monomers and dimeric Co-centres), no bands at 10 to 15,000 $cm^{-1}$ (cluster species).

Example 3

Preparation of a Copper-Exchanged Zeolite

Synthesis took place as in example 1, except that a corresponding quantity of copper-acetylacetonate solution was used as metal salt and again 0.01 M $HNO_3$ as acid.

UV/VIS: 37-45,500 $cm^{-1}$ (m) (SCR active monomers and dimeric Cu-centres), no bands at 10 to 15,000 $cm^{-1}$ (cluster species).

Example 4

Preparation of a Silver-Exchanged Zeolite

Synthesis took place as in example 1, except that $AgNO_3$ was used as metal salt and 0.01 M $HNO_3$ as acid.

Example 5

Preparation of a Nickel-Exchanged Zeolite

Synthesis took place as in example 1, except that $Ni(NO_3)_2$ was used as metal salt and 0.01 M $HNO_3$ as acid.

Example 6

The catalyst obtained in example 1 was tested during the reduction of NO to $N_2$.

The catalyst obtained according to the invention was hydrothermally aged at 800° C. for 12 hours in an atmosphere with 10% water vapour, then pressed into shaped bodies and sieved to a size of 0.4 to 0.8 mm.

Likewise, a comparison catalyst which was obtained according to the example of EP 955 080 B1 was hydrothermally aged in the same manner. This comparison catalyst was obtained by solid-state ion exchange.

The exhaust-gas composition for the comparison test was:
NO: 500 ppm
$NH_3$: 500 ppm
$H_2O$: 50 vol. %
SV (space velocity): 80,000
Remainder $N_2$.

The test was carried out under customary test conditions.

TABLE 1

| | Conversion of NO to $N_2$ | |
|---|---|---|
| Temperature | Fe zeolite example 1 | Comparison Fe zeolite |
| 200° C. | 35% | 24% |
| 350° C. | 95% | 88% |
| 500° C. | 92% | 88% |

As can be seen from Table 1, the conversion of NO to $N_2$ using a catalyst obtained according to the invention is clearly higher at 350° C. than when using a comparison catalyst from the state of the art. The temperature of 350° C. is approximately the optimum temperature for the above-named $DeNO_x$ processes.

The increase in activity at 350° C. was thus approx. 58%.

It is understood that the foregoing description is that of the preferred embodiments of the invention and that various changes and modifications may be made thereto without departing from the spirit and scope of the invention as defined in the appended claims.

The invention claimed is:

1. A process for the preparation of a metal-exchanged zeolite comprising providing an aqueous suspension of a zeolite having a zeolite skeleton in a sealable reaction vessel and then:
   a) increasing the pH of the suspension to a value in the range from 8 to 10 using $NH_4OH$, and setting the oxygen level of the reaction vessel to a value of <10%,
   b) reducing the pH to a value in the range from 1.5 to 6,
   c) adding a metal salt including a replacement metal and reacting the suspension over a period of 1 to 15 hours to prepare a metal-exchanged zeolite, and
   d) filtering off and washing the metal-exchanged zeolite.

2. The process according to claim 1, wherein the suspension of step a) contains 5 to 25 wt.-% zeolite.

3. The process according to claim 1, wherein a molar ratio of ammonia to zeolite at the end of step a) has a value of 0.01 to 0.1.

4. The process according to claim 1, wherein the pH is reduced in step b) by adding a mineral acid.

5. The process according to claim 4, wherein the pH in step b) is set to a value in the range from 1.5 to 3.

6. The process according to claim 4, wherein, after reducing the pH in step b), the suspension is heated to a temperature in the range from 80 to 100° C.

7. The process according to claim 6, wherein, during the exchange reaction in step c), the oxygen level in the reaction vessel is less than 5%.

8. The process according to claim 7, wherein the zeolite obtained after step d) is dried at a temperature of greater than 100° C.

9. The process according to claim 7, wherein the process is carried out several times.

10. The process according to claim 8, wherein the dried zeolite is calcined at a temperature of 400 to 600° C.

11. The process according to claim 10, wherein the calcination takes place under inert gas.

12. The process according to claim 1, wherein the zeolite is selected from the group consisting of AEL, BEA, CHA, EUO, FAO, FER, KFI, LTA, LTL, MAZ, MOR, MEL, MTW, LEV, OFF, TON, ERI, and MFI.

13. The process according to claim 12, wherein the zeolite is selected from the group consisting of BEA, MFI, FER, MOR, MTW, and ERI.

14. The process according to claim 1, wherein a pore size of the zeolites is from 0.4 to 1.5 nm.

15. The process according to claim 14, wherein the replacement metal is catalytically active.

16. The process according to claim 15, wherein the replacement metal is selected from the group consisting of Fe, Co, Ni, Ag, Cu, V, Rh, Pd, Pt, and Ir.

17. The process according to claim 16, wherein the replacement metal is selected from the group consisting of Fe, Co, Ni, and Cu.

18. The process according to claim 16, wherein the replacement metal is provided in step c) in a quantity of 1 to 5 wt.-% calculated as metal oxide relative to the total weight of the zeolite.

19. The process according to claim 18, wherein 70% to 90% of the exchangeable sites of the zeolite obtained in step d) are occupied by the replacement metal.

20. A process for the preparation of a metal-exchanged zeolite comprising providing an aqueous suspension of a zeolite having a zeolite skeleton in a sealable reaction vessel and then:
   a) increasing the pH of the suspension to a value in the range from 8 to 10 using a base, and setting the oxygen level of the reaction vessel to a value of <10%,
   b) reducing the pH to a value in the range from 1.5 to 6,
   c) adding a metal salt including a replacement metal and reacting the suspension over a period of 1 to 15 hours to prepare a metal-exchanged zeolite, and
   d) filtering off and washing the metal-exchanged zeolite.

* * * * *

UNITED STATES PATENT AND TRADEMARK OFFICE
CERTIFICATE OF CORRECTION

PATENT NO. : 9,669,397 B2
APPLICATION NO. : 14/324498
DATED : June 6, 2017
INVENTOR(S) : R. Althoff et al.

It is certified that error appears in the above-identified patent and that said Letters Patent is hereby corrected as shown below:

In the Specification

In Column 3:
Line 54: delete "$SiO_4/AlO_4$" and substitute -- $SiO_4/AlO_4^-$ -- therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*